Jan. 21, 1947.

C. M. TUMEY ET AL 2,414,779

PRESSURE-EXPANSION ROTARY ENGINE

Filed May 26, 1944

6 Sheets-Sheet 4

INVENTORS,
Charles M. Tumey and
Earl E. Bowers,
By Herbert A. Minturn,
Attorney.

Jan. 21, 1947.  C. M. TUMEY ET AL  2,414,779
PRESSURE-EXPANSION ROTARY ENGINE
Filed May 26, 1944  6 Sheets-Sheet 5

INVENTORS,
Charles M. Tumey and
Earl E. Bowers,
By Herbert A. Minturn,
Attorney.

Jan. 21, 1947.  C. M. TUMEY ET AL  2,414,779
PRESSURE-EXPANSION ROTARY ENGINE
Filed May 26, 1944  6 Sheets-Sheet 6

INVENTORS,
Charles M. Tumey and
Earl E. Bowers,
By Herbert A. Minturn,
Attorney.

Patented Jan. 21, 1947

2,414,779

UNITED STATES PATENT OFFICE 2,414,779

PRESSURE-EXPANSION ROTARY ENGINE

Charles M. Tumey, Indianapolis, and Earl E. Bowers, Lebanon, Ind., assignors to Universal Corporation, a corporation of Indiana Application May 26, 1944, Serial No. 537,442

11 Claims. (Cl. 121—70)

1

This invention relates to a rotary, pressure type engine wherein a fluid is admitted into the juncture of two annular chambers to drive intermeshing geared rotors in opposite directions within those chambers. A primary object of the invention is to provide a reversible engine of that type constructed in a very compact manner to achieve the highest possible thermal, as well as mechanical efficiencies.

Another important object of the invention is to provide multiple expansion of the operating fluid with direct inner flow of fluids between various stages. A still further important object of the invention is to provide a valve means for controlling the flow of the fluid between the various stages of the engine to confine such flows to the minimum length of travel.

Figure 1:
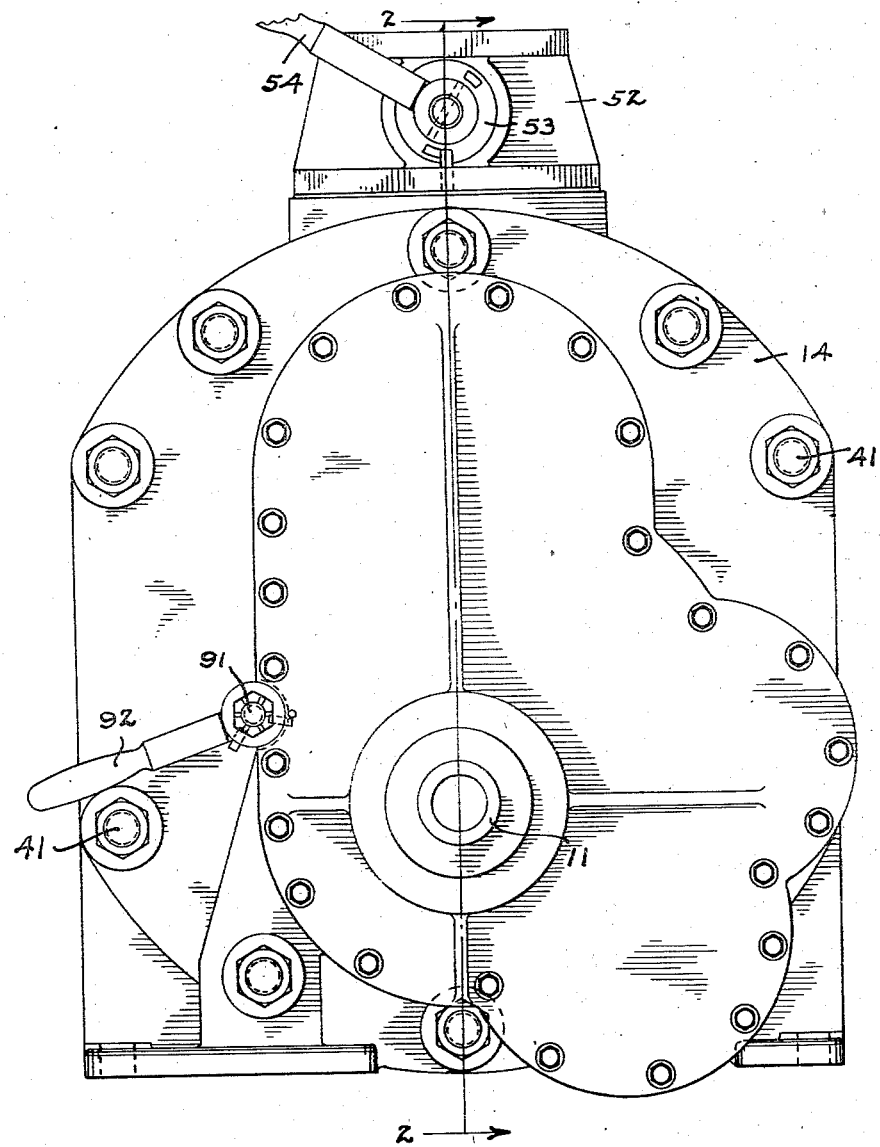
Figure 2:
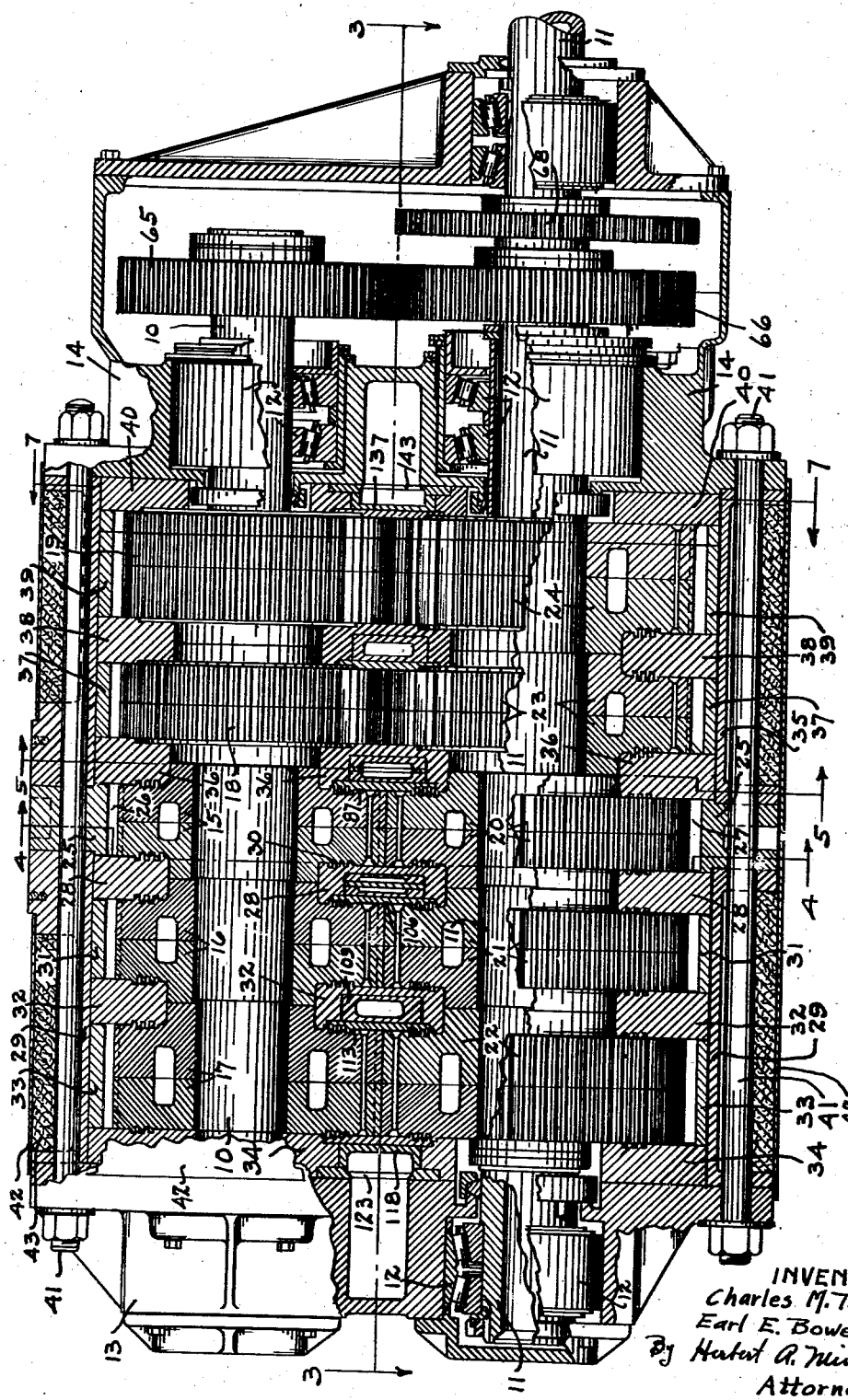
Figure 3:
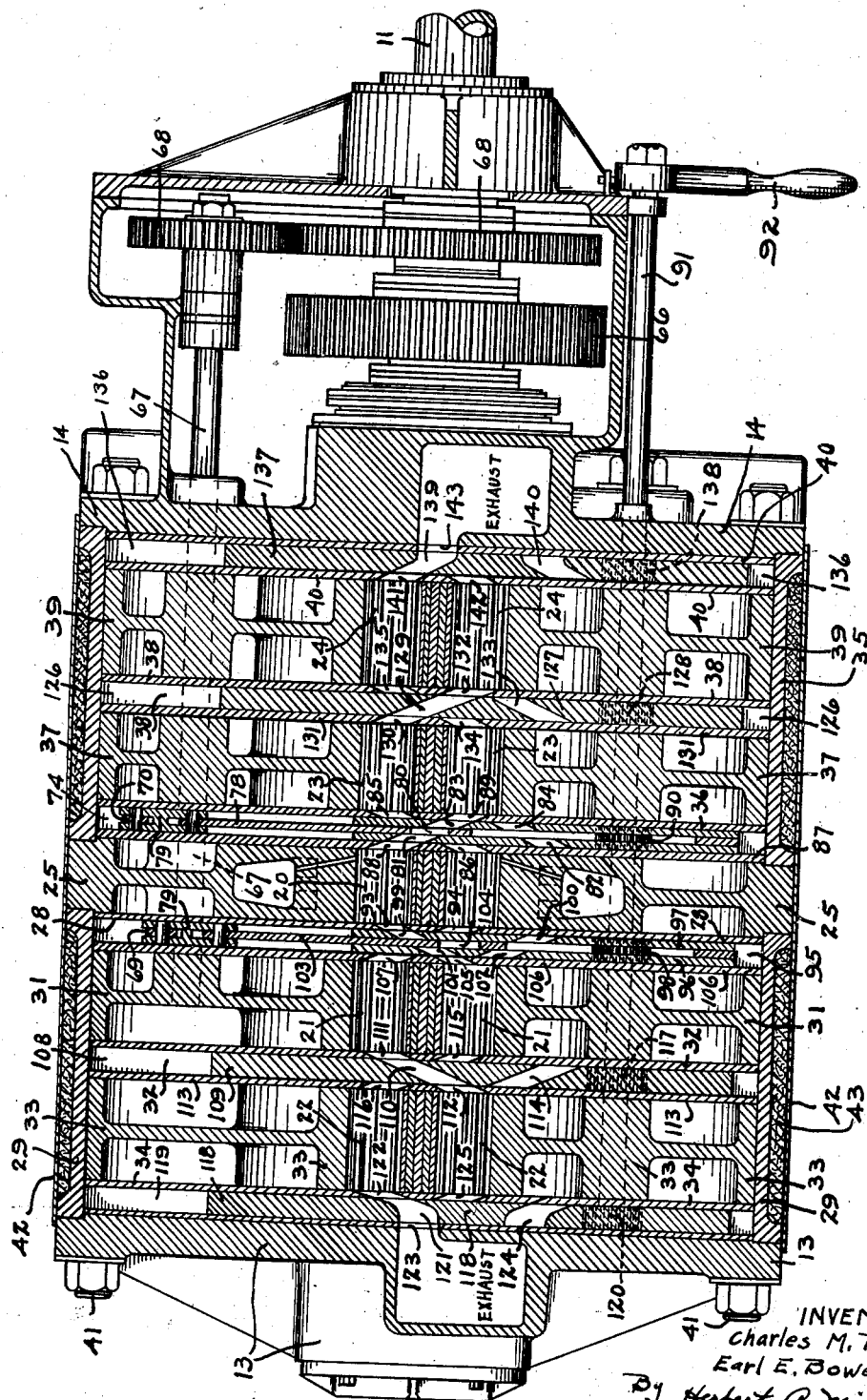
Figure 4:
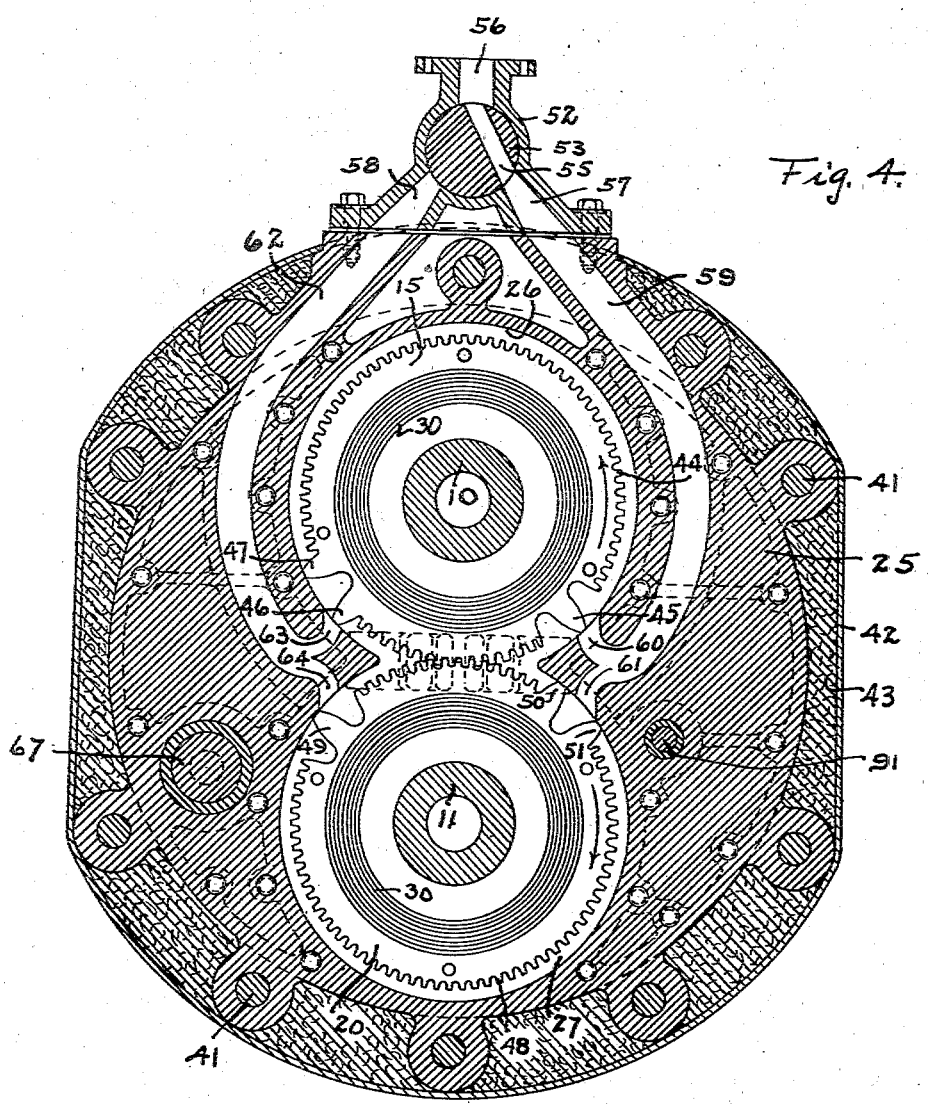
Figure 5:
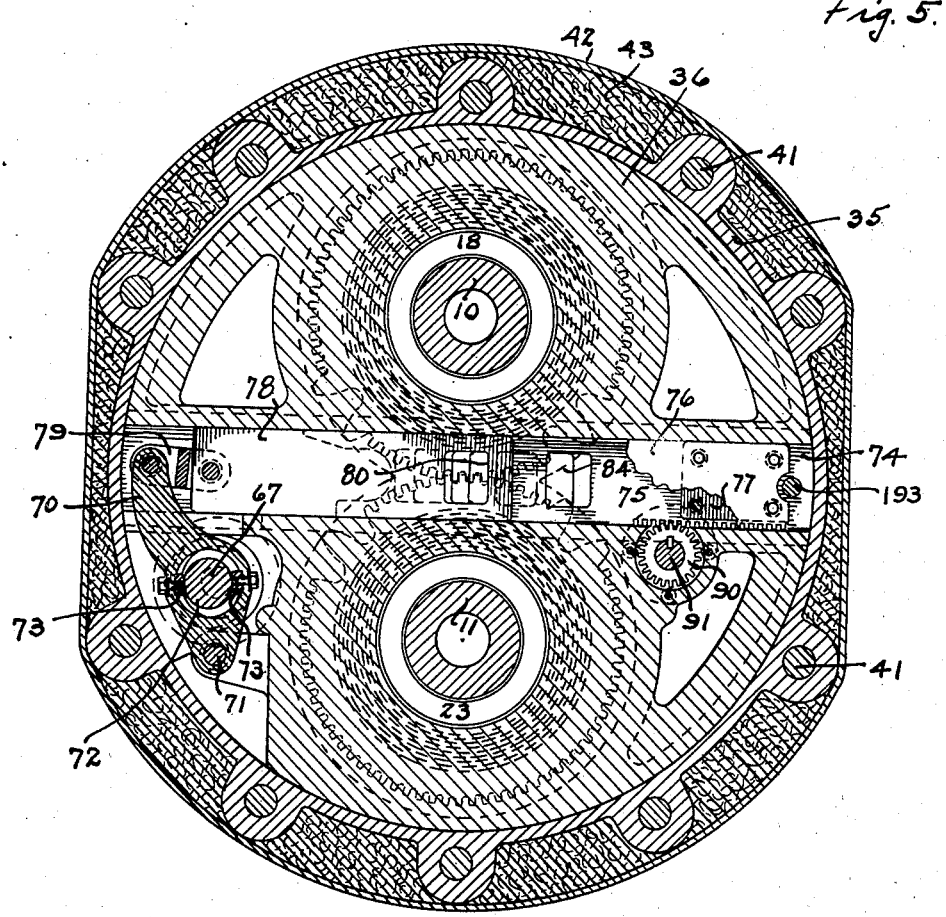
Figure 6:
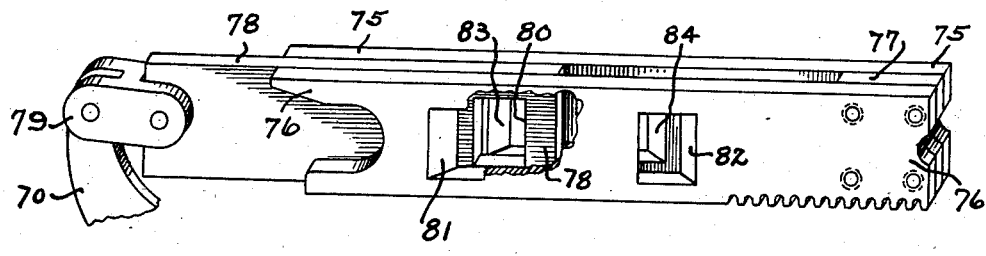

These and other important objects and advantages of the invention will become apparent to those versed in the art in the following description of one particular form of the invention as illustrated in the accompanying drawings, in which Fig. 1 is a view in rear end elevation;

Fig. 2, a view in central vertical longitudinal section on the line 2—2 in Fig. 1;

Fig. 3, a view in central transverse longitudinal section on the line 3—3 in Fig. 2;

Fig. 4, a transverse vertical section on the line 4—4 in Fig. 2;

Fig. 5, a view in transverse vertical section on the line 5—5 in Fig. 2;

Fig. 6, a detail on an enlarged scale in perspective of a valve structure; and

Figure 7:
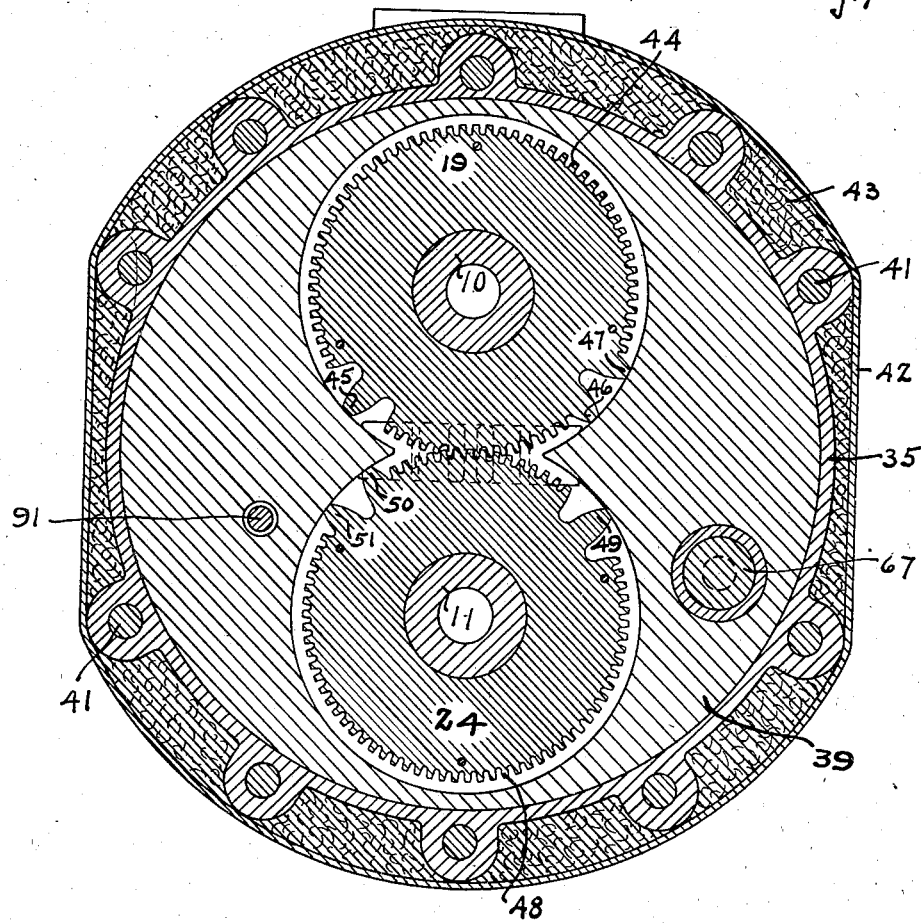

Fig. 7, a view in transverse vertical section on the line 7—7 in Fig. 2.

Like characters of reference indicate like parts throughout the several views in the drawings.

Upper and lower stepped rotor shafts 10 and 11 respectively are supported in spaced apart relation to have the axes in a common vertical plane by bearings, preferably roller bearings 12 on outer end portions of the shafts mounted respectively in the front and rear bearing heads 13 and 14.

Fixed on the upper shaft 10 are a plurality of gear like rotors consisting of the center high pressure rotor 15, an intermediate pressure rotor 16 to the left, Fig. 2; a low pressure rotor 17 to the left of the rotor 16; an intermediate pressure rotor 18 to the right of rotor 15, and a low pressure rotor 19 to the right of the rotor 18. In like manner the lower shaft 11 carries the corresponding and intermeshing rotors 20 to mesh with rotor 15; 21 to mesh with rotor 16; 22 to mesh with rotor 17; 23 to mesh with rotor 18; and 24 to mesh with rotor 19.

The high pressure rotors 15, 20, have the narrowest longitudinal length of face; the faces of the intermediate and low pressure rotors increasing respectively in width. While each of the named rotors may be formed in one piece, for convenience in manufacturing, each rotor is made of two sections coming together face to face in a plane centrally of the longitudinal length of the combined pieces.

A central high pressure cylinder plate 25 is provided with longitudinal bores 26 and 27, Figs. 2 and 4, the two chambers opening one into each other through a chordal plane, through which opening the gears 15 and 20 inter-mesh.

To the left of the cylinder plate 25 is a cylinder side plate 28 abutted against the cylinder plate 25 and fitted within an aligning cylinder 29. This side plate 28 extends along and around the left hand faces of the rotors 15 and 20 and preferably forms seals therebetween in any suitable manner, such as by a series of labyrinth rings 30 for each rotor. Against the left hand side of the side plate 28 is an intermediate cylinder plate 31 having upper and lower cylinders intercommunicating to surround the rotors 16 and 21 and permit their meshing through the opening between those cylinders in the same manner as indicated for the high pressure unit. This intermediate cylinder plate 31 is axially located within the cylinder 29 to abut the side plate 28, whereby that plate forms the right hand side walls of the upper and lower cylinders carrying the rotors 16 and 21, and also serves to form the seal against the right hand sides of those two rotors.

A side plate 32 is slidingly fitted within the cylinder 29, the same as the side plate 28, and is abutted against the left hand face of the cylinder plate 31 to form seals around the rotors 16 and 21. All of the rotors have hubs which extend along the respective shafts 10 and 11 and which freely pass through openings in the plates 28 and 32.

Abutting the left hand side of the side plate 32 is the low pressure cylinder plate 33 which is provided with cylinders opening one into the other and within which the rotors 17 and 22 are contained. This cylinder plate 33 fits within the cylinder 29 with a sliding fit. A similar side plate 34 is slidingly fitted within the cylinder 29 to abut the left hand side of the cylinder plate 33 and to form seals around the left hand faces of the upper and lower rotors 17 and 22 respectively. The front bearing head 13 has a right hand face to bear against the side plate 34 and also the end of the cylinder 29. The aligning cylinder 29, by its right hand end, abuts the high pressure cylinder plate 25.

On the right hand side of the high pressure cylinder plate 25 is an aligning cylinder 35 within which is slidingly fitted in consecutive order the side plate 36 between upper rotors 15 and 18 and the lower rotors 20 and 23; the intermediate pressure rotor plate 37 within which rotors 18 and 23 are carried; the side plate 38 enclosing those rotor cylinders on the right hand side and forming seals with the same rotors, and also forming seals with the low pressure rotors 19 and 24; the low pressure cylinder plate 39 abutting the side plate 38 and having cylinders within which the rotors 19 and 24 revolve; and the end plate 40 abutting the cylinder plate 39 and forming seals with the rotors 19 and 24. The rear end bearing head 14 abuts the end plate 40 and also the outer end of the aligning cylinder 35. A plurality of through bolts 41 pass through ears of the bearing heads 13 and 14 to compressibly engage therebetween all of the various plate elements recited. Surrounding the aligning cylinders 29 and 35 is a jacket 42 to carry between it and those cylinders insulating material 43 to prevent loss of heat.

Referring to Fig. 4 wherein rotors 15 and 20 are shown in side elevation, that is transversely of the axes of the shafts 10 and 11, the rotor 15 has its major peripheral portion cut to form gear teeth 44, the outer ends of which are spaced inwardly from the circumferential wall of the cylinder in which it appears in the plate 25 so as to leave an opening around the rotor therebetween. This opening however is interrupted by a major tooth 45, the outer end of which is in substantially sliding contact with the circumferential wall of the cylinder 26, and then 90 degrees around from that tooth 45 is the second major tooth 46 likewise extending radially outwardly into substantially sliding contact with the wall of the cylinder 26, to be followed by a third major tooth 47 extending to the wall of the cylinder to revolve therearound. Between teeth 45 and 46, the minor teeth 44 continue. The lower rotor 20 is likewise provided with teeth 48 around the major circumferential length thereof to have their outer ends spaced inwardly from the circumferential wall of the cylinder 27 to leave an annular passageway therearound. The rotor 20 is provided with a major tooth 49, and the minor teeth of the two rotors 15 and 20 are so meshed through the opening between the cylinders 26 and 27 that the tooth 49 will mesh between the teeth 46 and 47 in driving relation therewith, as well as in sealing relation. The rotor 20 is further provided with the major teeth 50 and 51 between which the tooth 45 of the rotor 15 will mesh in sealing and driving relation so that rotation of one rotor about its axis will cause continuous rotation of the other rotor about its own axis without any interruption in the drive.

All of the other pairs of rotors have the same diameters and are formed to have peripheral teeth both minor and major, in exactly the same manner as has been described in relation to rotors 15 and 20, the only difference in the rotors being that from the high pressure pair of rotors, the rotors increase in width for the intermediate pressure rotors and the low pressure rotors, all as indicated in Fig. 2.

Still referring to Fig. 4, a fluid admission valve 52 is mounted to center over the high pressure cylinder 26. While it is conceivable that a range of fluids may be employed, the present invention will be described as using steam, preferably high pressure, high temperature, super-heated steam. A valve plug 53 is mounted within the valve 52 to be turned on a horizontal axis by means of an externally presented throttle lever 54, Fig. 1. The plug 53 is provided with a chordal passageway 55 thereacross so that the plug 53 may be turned to have this passageway 55 selectively register with the intake passageway 56 and a discharge passageway 57 both carried within the valve 52, or for reversing purposes the plug 53 may be turned to have the plug passageway 55 intercommunicate between the intake passageway 56 and with the discharge passageway 58.

In the position of the plug 53 as shown in Fig. 4, steam is admitted through the intake passageway 56 then through the plug passage 55 to travel through the valve discharge passage 57 and enter a steam conduit 59 provided within the cylinder plate 25 to extend around outside of the cylinder 26 and by diverging ways 60 and 61 open into the cylinders 26 and 27 respectively to direct steam essentially in the directions of rotations of those rotors 15 and 20 therein. The openings from the ways 60 and 61 are spaced circumferentially from the chordal plane across the intersection of the two cylinders.

In like manner, for reverse driving of the rotors 15 and 20 and consequently of the shafts 10 and 11 the valve plug 53 upon having its passage 55 turn to communicate between passages 56 and 58, will permit steam to flow through the conduit 62 provided around on the opposite side of the cylinder 26, from which conduit 62 steam may pass through the diverging ways 63 and 64 into the respective cylinders 26 and 27 circumferentially around in the direction of travel of the rotors from the opening between the two cylinders.

The shaft 10 is drivingly connected with the shaft 11 through spur gears 65 and 66, the drive being taken through these gears from the shaft 10 to the shaft 11. While all of the rotors are intermeshed in pairs through their respective teeth, the rotor teeth serve primarily as sealing means and not driving means, the inter-meshing of the minor teeth on the rotor serving to prevent inner-flow of steam across from one side of the inter-meshing to the other side.

From the shaft 11 extends a drive, Fig. 3, herein shown as a train of two gears 66 to drive a rocker shaft 67 which extends revolvably through the rear bearing head 14 and the various plates back to and across the center high pressure side plates 28 and 36. These two plates 28 and 36 are cut away to permit rockers 69 and 70 to be located therein. Referring to Fig. 5, rocker 70 is shown as being positioned in this cut away portion of the plate 36 to rock on a lower pivot pin 71 and extend upwardly therefrom. Through an opening in the rocker 70 extends the shaft 67 to have a cam 72 thereon against which on opposite sides bear the shoes 73 so that turning of the shaft 67 will cause the rocker 70 to oscillate about its pivot 71. The rocker 69 is mounted and operated in the same manner in the side plate 28. As indicated in Figs. 2, 3, and 5 primarily, the side plate 36 is provided with a slot 74 cut transversely and across its entire face. Within that slot is mounted a slide valve consisting essentially of two parts. One part is built up by securing two side plates 75 and 76 together through a spacing block 77, Fig. 6, to leave a space therebetween within which the other element consisting of a slide bar 78 may reciprocate. This slide bar 78 is connected through a link 79 with the upper end of the rocker 70 whereby turning of the shaft 67 will cause the rocker 70 to reciprocate the slide bar 78 within the slot 74 and between the two side plates 75 and 76, the top and bottom faces of the slot 74 being contacted slidingly by the respective top and bottom edges of the bar 78. The slide bar 78 has a window 80 therethrough adjacent the inner end. The plate 76 is provided with a pair of windows 81 and 82 spaced apart a distance exceeding the longitudinal opening of the window 80. The other plate 75 is also provided with a pair of windows 83 and 84 spaced closer together than are the windows in the plate 76, the vertical edges of these windows being so arranged that the opposing edges of the window 81 are in common opposite planes of the edges of the window 83, these two opposing planes being diagonally disposed, whereas the vertical opposing edges of the window 82 are in common opposing planes with the like edges of the window 84.

Through the right hand portion of the plate 36 back of the valve slot 74 is positioned a window 85 opening from the juncture of the cylinders in the cylinder plate 37 back of the inter-meshing teeth of the upper and lower rotors 18 and 23 and extending horizontally and diagonally to the left to have its vertical edge faces in alignment with a corresponding window 86 entering a valve cover plate 87 from the forward side of the inter-meshing teeth of the rotors 15 and 20 and the high pressure cylinders, it being understood that the valve elements 75, 76, and 78 are disposed therebetween. This valve plate 87 carries a second window 88 on the other side of the inter-meshed teeth of those rotors 15 and 20 to extend diagonally in line with the vertical edges of an opening 89 in the side plate 36 to the right of the valve elements to open into the cylinder space on the other side of the inter-meshed teeth of the rotors 18 and 23 in respect to the window 85. In the position shown in Fig. 3, the windows 88, 81, 83, and 89 are all in alignment diagonally across the side plate 36, and the valve slide bar 78 is positioned to have its window 80 within this diagonal passage-way whereby steam may escape from the high pressure cylinder across the side plate 36 into the intermediate pressure cylinder.

Reciprocation of the slide bar 78 carries the window 80 out of register with that diagonal passage-way whereby that passage-way is intermittently opened and closed thereby all through the turning of the shaft 67 to rock the arm 70.

The right hand end of the valve element, Figs. 5 and 6, comprising the bars 75 and 76 has teeth cut in the under edges of those bars to form a rack gear to mesh with a pinion gear 90 that is fixed to a valve shifter shaft 91 which extends forwardly through the various plates to terminate by an end exposed at the rear of the engine, Figs. 1 and 3, to be operated by a hand lever 92. Rocking the shaft 91 will change the position of the plates 75 and 76 along the slot 74 and accordingly vary the positions of the windows 81 and 84 in respect to the slide bar window 80.

To reverse the direction of flow of the fluid as between cylinders in the plates 25 and 37, the hand lever 92 is rocked from the position shown in Fig. 1 to shift the valve elements 75 and 76 away from the stop pin 103, Fig. 5, toward the left of the slot 74 to bring the window 84 into register with the window 85, Fig. 3, and the window 82 into register with the window 86 thereby closing off flow through windows 88 and 89 and permitting a flow from window 86 through window 82, window 80, of the reciprocating bar 78, window 84 and window 85, it being understood that this passage-way would be intermittently opened and closed by a reciprocation of the bar 78 to bring the window 80 into and out of registry of that passage-way. In other words, when the engine is to be reversed in direction, not only is the fluid inlet valve plug 53 shifted, but this shaft 91 must also be shifted to change the valve elements 75 and 76 as described.

The high pressure cylinder plate 25 is also provided with outlet openings 93 to the back of the inter-meshing rotor and 94 to the front thereof, these openings being windows in the side plate 28 opening into a transverse slot 95 cut across the left hand face of the plate 28. In this slot is slidingly fitted spaced apart valve plates 96 and 97 anchored at their front hand ends one in respect to the other and reciprocated within the slot by means of the spur gear 98 which is fixed to the shaft 91 whereby the members 96 and 97 are simultaneously shifted along with the shifting of the valve plates 75 and 76 in the slot 74. The valve plate 97 is provided with spaced apart windows therethrough 99 and 100 respectively. The other plate 96 has the windows 101 and 102 spaced apart to be diagonally in line respectively with the windows 99 and 100, the windows 101 and 102 being nearer together than are the windows 99 and 100. A reciprocating bar 103 is linked to the rocker 69 and carries a window 104 out of registry in the positions of the elements shown in Fig. 3 with a passage-way defined by the windows 93, 99, 101, and 105, provided in the valve slot cover plate 106 to the right of the inter-meshing rotor in the cylinder plate 31. When the valve members 96 and 97 are shifted to the left to have the window 100 register with the window 94 and the window 102 register with the window 101 in the valve plate 106, the reciprocating bar window 104 will then intermittently register with the passage-way then defined through the window 94, window 100, window 102 and window 101.

In the side plate 32 is cut a central horizontal slot 108 within which is slidingly mounted a single valve bar 109 having a diagonal passage-way 110 therethrough registering in the position indicated in Fig. 3 with a window 111 to the back of the intermeshing rotors in the cylinder plate 31 and also with a window 112 formed in the slot cover plate 113 to the front of the inter-meshing rotors in the cylinder plate 33. This valve bar 109 is further provided with a diagonal passageway 114 therethrough which, upon the bar being shifted to the back will register with the window 115 in the side plate 32 opening to the front of the inter-meshed rotors in the cylinder plate 31 and the window 116 in the slot cover plate 113 to the back of the inter-meshed rotors in the cylinder plate 33. The shifting of this valve bar 109 is accomplished by means of a spur gear 117 fixed to the shaft 91 and interengaging with teeth (not shown) on the under side thereof exactly in the same manner as indicated in respect to the gear 90 in Fig. 5.

Then to control flow of fluid from the low pressure cylinder plate 33, a sliding valve bar 118 is mounted within a slot 119 cut horizontally and transversely across the back face of the side plate 34. This valve bar 118 is also shifted within its slot 119 by rocking of the shaft 91 to shift the bar through the spur gear 120 thereunder. This bar 118 is provided with a passageway 121 therethrough registering in the position shown in Fig. 3 with a window 122 in the side plate 34 opening on the back side of the intermeshed rotors in the cylinder plate 33 and also with an exhaust port 123. When the bar 118 is in its back position, a second passageway 124 thereacross will register with the window 125 in the side plate 34 opening to the front of the inter-meshed rotors in the cylinder plate 33 and also with the exhaust port 123.

The side plate 38 has a slot 126 cut horizontally and centrally across its left hand face to receive therein the valve slide bar 127 to be reciprocated within the slot by means of the spur gear 128 fixed on the shaft 91. This slide bar 127 is provided with a diagonal passage-way 129 thereacross registering in the position indicated in Fig. 3 with the window 130 in the slot cover plate 131 opposite the window 85 across the cylinder plate 37 and with the window 132 through the side plate 38 to the front of the inter-meshed rotors in the cylinder plate 39. The bar 127 also carries a second diagonal passage-way 133 which, when the bar 127 is shifted to the back in its slot, will register with the window 134 of the cover plate 131 and the window 135 in the side plate 38 to reverse the direction of flow. The side plate 40 has a slot 136 cut across its right face centrally and horizontally thereacross within which is slidingly mounted the slide bar 137 shifted by means of the spur gear 138 fixed to the shaft 91. This bar 137 carries the oppositely directed cross passage-ways 139 and 140 selectively registering with the window 141 in the left face of the side plate 40 and the exhaust port 143 in the position shown in Fig. 3, and when the bar 137 is shifted, the passage-way 140 will register with the window 142 and the exhaust port 143.

The gears of the train 68 operate the rocker shaft 67 at twice the speed of the shaft 11 and the rockers 69 and 70 are mounted in relation to the operating cams on the shaft 67 to reciprocate in opposite directions whereby, for example, the slide bar 78 will be in the open position when the slide bar 103 is in the closed position during one half of the shaft 11 revolution and vice versa during the other half.

With this timing of the travel of the slide bars 78 and 103, during the first half of the shaft 11 revolution as indicated in Fig. 3, and with the valve plug 53 in the position shown in Fig. 4, steam will be admitted through the passageway 59 to drive the high pressure rotors 15 and 20 in the directions of the arrows as shown in Fig. 4, steam flowing through the way 60 into the chamber 26 to follow around against the tooth 47 in a counter-clockwise direction, and also flowing through the way 61 to follow in clockwise direction around the cylinder 27 against the tooth 49, and thereafter, as the teeth 45 and 51, 50 pass the ways 60 and 61 respectively, against the teeth 45 and 50. After the teeth 46 and 47 pass the passageway 60 steam between the teeth 45 and 47 and between the teeth 51 and 49 will escape from the back side, Fig. 3, of the intermeshing teeth 44 and 48 through the passageway defined by the openings 80, 81, 89, 83, and 89 into the plate 37 forwardly of the inter-meshing teeth so as to apply pressure to drive the rotors 18 and 23 in the same directions respectively as the turning of the high pressure rotors 15 and 20. Continuing with the rotation of the rotors, steam will escape from the back side of the inter-meshing rotors 18 and 23 through the passageway defined by the openings 130, 129, and 132 forwardly of the inter-meshing rotors 19 and 24 to have that steam expand and aid in turning those rotors in the same relative directions as the upper and lower rotors in the other chambers. From the back side of the rotors 19 and 24, steam finally escapes through the passageway 141, 139 and 143 of the exhaust conduit. It is to be understood, of course, that the bars 127 and 137 remain stationary at all times and are only shifted when the engine is to be reversed in direction of rotation.

Now, with the slide bar 103 in the closed position as indicated in Fig. 3, rotors 16, 21 and 17, 22 are being driven only under expansive pressure of the steam previously admitted during another cycle and with the two to one drive ratio between the shafts 11 and 67, these slide bars 78 and 103 reciprocate to alternately open and close passageways first for direct flow from the high pressure rotors 15 and 20 to the right hand rotors, Fig. 3, during the first half cycle of revolution of shaft 11 and during the second half to have steam flow from those high pressure rotors to left hand rotors.

In other words during the first half revolution, steam will be admitted to the right hand rotors, Fig. 3, and during the second half of that revolution steam will be admitted from the high pressure rotors to the left hand rotors. In other words steam is intermittently supplied to the right and left hand sides of the high pressure rotors to flow and expand first between the intermediate sets of rotors and then the lower pressure rotors in the outer ends.

To reverse the engine, all that is necessary is to reverse the position of the plug 53, turning it in a counter-clockwise direction in reference to Fig. 4 to have the passageway 55 interconnect passageways 56 and 58; and also shift the reversing valve handle 92 around in a clockwise direction, Fig. 1. While labyrinth packing has been indicated above as desirable between the side faces of the rotors, and the adjacent side plates between cylinders, the leakage problem in the form of the invention herein shown is reduced to practically nothing since any steam escaping along the sides of the rotors can only travel into the next rotor. The low pressure at the outer faces of the low pressure rotors induces very little tendency to leak in any event. In other words, the labyrinth packing may be omitted entirely to reduce resistance to turning of the various parts.

Therefore, while we have herein shown and described our invention in the one particular form in more or less minute detail, it is obvious that structural changes may be embodied, particularly in the drive of the valves and the form of the intermeshing and drive teeth of the rotors, and in the manner of forming the rotor cylinders of the rotors themselves, all without departing from the spirit of the invention, and we, therefore, do not desire to be limited to that precise form any more than may be required by the following claims.

We claim:
1. In a pressure type rotary engine, the combination of a plurality of pairs of cylinders, in each pair of which one cylinder opens by a side chordally into the other cylinder; a bladed gear rotor in each cylinder intermeshing across said chordal opening with a like gear rotor in the other cylinder; said cylinders having passageways leading across from one side of the intermeshing of the rotors in one pair of cylinders to the other side of the intermeshing of rotors in the adja- cent cylinders; valve means intercepting said passageways leading from each end of one of said pairs of cylinders; and means driven by said rotors to operate said valve means to open and close alternately those passageways from said one cylinder pair.

2. In a pressure type rotary engine, the combination of a plurality of pairs of cylinders, in each pair of which one cylinder opens by a side chordally into the other cylinder; a bladed, gear rotor in each cylinder intermeshing across said chordal opening with a like gear rotor in the other cylinder; said cylinders having passageways leading across from one side of the intermeshing of the rotors in one pair of cylinders to the other side of the intermeshing of rotors in the adjacent cylinders; valve means intercepting said passageways leading from each end of one of said pairs of cylinders; and means driven by said rotors to operate said valve means to open and close alternately those passageways from said one cylinder pair; and reversing valve means carrying parts of said passageways to complete said passageways in one direction and close them off in the other direction by selective shifting of the reversing valve means; and means for shifting the reversing valve means.

3. In a pressure type rotary engine, two pairs of cylinders, one of each pair opening by a side into the other across a chordal plane; a rotor in each cylinder, each having minor teeth between the periphery of which and the cylinder wall is defined an annular chamber, and a major tooth, the outer end of which is in substantial sliding contact with said cylinder wall, said rotors intermeshing across said opening; spaced apart rotor carrying shafts, one for each set of rotors; a fluid inlet leading into one pair of said cylinders adjacent to and on one side of the intermeshing portions of the rotors; said two pairs of cylinders having an exhaust passageway leading diagonally across from the discharge side of said intermeshing portions of said one pair of cylinders to the second pair of said cylinders to the pressure side of their rotor intermeshed portions; and a valve shiftably intercepting said passageway operated from one of said shafts.

4. In a pressure type rotary engine, two pairs of cylinders, one of each pair opening by a side into the other across a chordal plane; a rotor in each cylinder, each having minor teeth between the periphery of which and the cylinder wall is defined an annular chamber and a major tooth, the outer end of which is in substantial sliding contact with said cylinder wall, said rotors intermeshing across said opening; spaced apart rotor carrying shafts, one for each set of rotors; a fluid inlet leading into one pair of said cylinders adjacent to and on one side of the intermeshing portions of the rotors; said two pairs of cylinders having a fluid passageway leading diagonally across from the discharge side of said intermeshing portions of said one pair of cylinders to the second pair of said cylinders to discharge therein on the pressure side of their rotor intermeshed portions; and a valve shiftably intercepting said passageway operated from one of said shafts; a plate between each pair of cylinders forming side walls thereof and having said passageways formed thereacross; and said valve means being mounted within said plate between said cylinders to travel in substantial parallelism with said plate.

5. In a pressure type multiple expansion, rotary engine, the combination of a plurality of pairs of cylinders arranged side by side with common partition walls therebetween, the cylinders in each pair opening one into the other from their sides on a common chordal plane; a rotor in each cylinder having peripheral teeth intermeshing across said opening to leave an annular chamber around each rotor, and a large gear shaped tooth extending to the inner cylinder wall; said partition walls having a valve chamber, adjacent the intermeshing of said rotors, having fluid openings therein from adjacent pairs of cylinders from both sides of their rotor intermeshing; and a valve member in said chamber for selectively opening and closing said openings; said valve member comprising a slidable bar; and means for reciprocating said bar across said openings in timed sequence with the travel of said teeth.

6. In a pressure type multiple expansion, rotary engine, the combination of a plurality of pairs of cylinders arranged side by side with common partition walls therebetween, the cylinders in each pair opening one into the other from their sides on a common chordal plane; a rotor in each cylinder having peripheral teeth intermeshing across said opening to leave an annular chamber around each rotor, and a large gear shaped tooth extending to the inner cylinder wall; with a valve chamber in said partition walls, adjacent the intermeshing of said rotors, having fluid openings therein from adjacent pairs of cylinders from both sides of their rotor intermeshing; and a valve member in said chamber for selectively opening and closing said openings; said valve member comprising a slidable bar; and means for reciprocating said bar across said openings; a pressure fluid inlet leading into a central pair of said cylinders to one side of and adjacent to the intermeshing of the rotors therein; and said bar reciprocating means being formed to reciprocate the valve bar on one side of said central pair of cylinders oppositely to the reciprocation on the other side.

7. In a pressure type multiple expansion, rotary engine, the combination of a plurality of pairs of cylinders arranged side by side with common partition walls therebetween, the cylinders in each pair opening one into the other from their sides on a common chordal plane; a rotor in each cylinder having peripheral teeth intermeshing across said opening to leave an annular chamber around each rotor, and a large gear shaped tooth extending to the inner cylinder wall; with a valve chamber in said partition walls, adjacent the intermeshing of said rotors, having fluid openings therein from adjacent pairs of cylinders from both sides of their rotor intermeshing; and a valve member in said chamber for selectively opening and closing said openings; said valve member comprising a bar with passages thereacross for providing flows through said openings, selectively from opposite sides of said rotor intermeshings to adjacent cylinders.

8. In a pressure type multiple expansion, rotary engine, the combination of a plurality of pairs of cylinders arranged side by side with common partition walls therebetween, the cylinders in each pair opening one into the other from their sides on a common chordal plane; a rotor in each cylinder having peripheral teeth intermeshing across said opening to leave an annular chamber around each rotor, and a large gear shaped tooth extending to the inner cylinder wall; with a valve chamber in said partition walls, adjacent the intermeshing of said rotors, having fluid openings therein from adjacent pairs of cylinders from both sides of their rotor intermeshing; and a valve member in said chamber for selectively opening and closing said openings; said valve member comprising a bar with passages thereacross for providing flows through said openings, selectively from opposite sides of said rotor intermeshings to adjacent cylinders; a pressure fluid conduit entering a central pair of said cylinders adjacent the rotor intermeshing therein; and a second valve member cooperating with the first valve member on each side of said central pair of cylinders; said first valve member being held stationary in one of two positions of flow through said openings; and means for reciprocating said second valve member to open and close alternately the passageways opened by said first valve member.

9. In a pressure type, multiple expansion, rotary engine, a plurality of pairs of cylinders arranged side by side, the cylinders in each pair opening circumferentially one into the other across a chordal plane of intersection; a rotor in each cylinder having peripheral teeth intermeshing across said intersection with the teeth of the rotor of the intersecting cylinder, an annular chamber being formed between said teeth and the wall of each chamber, and a major tooth on each rotor extending to said wall; crisscross passageways being provided between each pair of cylinders across from respective sides of said intermeshing in one cylinder pair to opposite sides in the next adjacent pair; a valve chamber intercepting said passageways; and a valve member reciprocable in the chamber to provide flow through selected of said passageways, and timing means actuating said valve member in sequence with the travel of said major teeth.

10. In a pressure type, multiple expansion, rotary engine, a plurality of pairs of cylinders arranged side by side, the cylinders in each pair opening circumferentially one into the other across a chordal plane of intersection; a rotor in each cylinder having peripheral teeth intermeshing across said intersection with the teeth of the rotor of the intersecting cylinder, an annular chamber being formed between said teeth and the wall of each chamber, and a major tooth on each rotor extending to said wall; crisscross passageways being provided between each pair of cylinders across from respective sides of said intermeshing in one cylinder pair to opposite sides in the next adjacent pair; a valve chamber intercepting said passageways; and a valve member reciprocable in the chamber to provide flow through selected of said passageways; and a second valve member adjacent at least a part of said first valve member and reciprocating in respect to said first valve member alternately opening and closing said selected passageways.

11. In a pressure type multiple expansion, rotary engine, the combination of a plurality of pairs of cylinders arranged side by side with common partition walls therebetween, the cylinders in each pair opening one into the other from their sides on a common chordal plane; a rotor in each cylinder having peripheral teeth intermeshing across said opening to leave an annular chamber around each rotor, and a large gear shaped tooth extending to the inner cylinder wall; said partition walls having a valve chamber, adjacent the intermeshing of said rotors, having fluid openings therein from adjacent cylinders from both sides of their rotor intermeshing; and a valve member in said chamber for selectively opening and closing said openings; said valve member comprising a slidable bar; and means for reciprocating said bar across said openings in timed sequence with the travel of said teeth; said reciprocating means including means for reciprocating said bars in opposite directions on opposite sides of one of said pairs between other pairs of cylinders whereby flow passageways through said walls from said one pair of cylinders is had in alternate lateral directions first to the pair of cylinders next adjacent on the one side, and next to the pair of cylinders next adjacent on the other side.

CHARLES M. TUMEY.
EARL E. BOWERS.